United States Patent Office 2,811,562
Patented Oct. 29, 1957

2,811,562

CONDENSATION OF ISOBUTYRALDEHYDE WITH LOWER ALIPHATIC ALDEHYDES

Hugh J. Hagemeyer, Jr., Longview, Tex., assignor to Eastman Kodak Company, Rochester, N. Y., a corporation of New Jersey No Drawing. Application June 28, 1954,
Serial No. 439,865

7 Claims. (Cl. 260—602)

This invention is concerned with an improved process for the production of mixed aldols of isobutyraldehyde. It is concerned with a process wherein isobutyraldehyde and lower aliphatic aldehydes are reacted in the form of mixed aldols by carrying out the condensation in the presence of an alkali metal carbonate. It is specifically concerned with a process for the production of hydroxypivalaldehyde by reacting isobutyraldehyde and formaldehyde at temperatures from 50–90° C. in the presence of an alkali metal carbonate. The invention is further concerned with a process wherein the lower aliphatic aldehyde is added to a reaction vessel containing an excess of isobutyraldehyde and the alkali metal carbonate and heated to a temperature of 50–90° C. It is further concerned with a process for producing mixed aldols of isobutyraldehyde which avoids the formation of other aldol products, and of the usual Cannizzaro and Tischenko reaction products. It is also specifically concerned with a process for the production of hydroxypivalaldehyde wherein formaldehyde is reacted with at least a molar excess of isobutyraldehyde in the presence of an alkali metal carbonate at a temperature in the range of 50–90° C. Then substantially pure hydroxypivalaldehyde is obtained by separating the organic layer and stripping off unchanged isobutyraldehyde.

No prior art process has been reported in which the mixed aldol of isobutyraldehyde and a lower aliphatic aldehyde is substantially the sole product. Hydroxypivalaldehyde has been prepared from isobutyraldehyde and formaldehyde in the presence of potassium carbonate by Wesseley, Monatshefte 21, 216–234 (1900). Later experiments using this same procedure are reported by Fourneau et al., Bull. Soc. Chim. (4), 47, 871 (1930) and Stiller et al., J. Am. Chem. Soc., 62, 1785 (1940). In the prior art references, relatively large amounts of potassium carbonate were added to equimolar parts of isobutyraldehyde and formalin at low temperatures, 10–20° C. Some of the disadvantages of this prior art method were low yields, long reaction times, large catalyst requirements, and incomplete reaction of the formaldehyde. I have found that mixed aldols of isobutyraldehyde may be prepared, by a process in which a relatively small amount of alkali metal carbonate is used, a fast reaction time is obtained and complete reaction of the formaldehyde or other aldehyde used with isobutyraldehyde, is realized. In addition the formation of condensation products other than the mixed aldol is avoided by carrying out the reaction at or above the reflux temperature of isobutyraldehyde. It is an object of my invention to provide such a process.

The process of the present invention makes use of the discovery that isobutyraldol is completely dealdolized at about 60° C. I have found that mixed aldols of isobutyraldehyde with formaldehyde and aldehydes containing from 2–10 carbon atoms do not dealdolize at temperatures in the range of 50–90° C. Thus, I have found it possible to carry out a mixed aldol condensation of isobutyraldehyde with another aldehyde in a temperature range such that no isobutyraldol is formed. If the reaction is carried out according to the process of the invention, and the aldehyde to be condensed with isobutyraldehyde is added to a solution of hot isobutyraldehyde containing the alkali metal carbonate catalyst, the sole product of the reaction is a 3-hydroxy-2,2-dimethyl aldehyde.

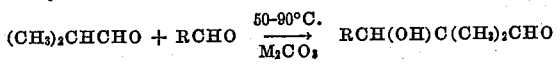

wherein R is hydrogen or a 1–9 carbon alkyl radical.

In producing the mixed aldol products, and particularly in preparing hydroxypivalaldehyde, it is advantageous to use at least a one mole excess of isobutyraldehyde so that a complete recovery of the hydroxypivalaldehyde is realized in the organic layer. In the process of the present invention I have found that optimum results are obtained by employing molar excesses of isobutyraldehyde ranging from 1 to 5. The catalyst is usually a solution of potassium, sodium or lithium carbonate in water and the weight of catalyst used varies with the particular aldehydes reacted. Thus, in making hydroxypivalaldehyde and employing a one mole excess of isobutyraldehyde, I have found it advantageous to use 4% potassium carbonate based on the weight of isobutyraldehyde charged to the reactor.

Mixed aldols of isobutyraldehyde with formaldehyde, acetaldehyde, propionaldehyde and butyraldehyde are made according to the invention by adding the aldehydes to a refluxing solution of isobutyraldehyde in the presence of aqueous potassium carbonate. Although any soluble alkali carbonate may be used, potassium carbonate is usually preferred and the amount used can vary from 2–10% based on the weight of isobutyraldehyde charged to the reactor. The catalyst is preferably charged as a 20–50% aqueous solution in water. Reaction temperatures varying from 50–90° C. have been used and I have found that the optimum results are usually obtained in the temperature range 60–75° C. At temperatures below this broader range, aldol products other than the mixed aldol are formed and at temperatures above 90° C., there is considerable yield loss due to the formation of the Tischenko product of the mixed aldol. This is avoided in the present process by adding the aldehyde to be reacted to isobutyraldehyde at reflux in the presence of aqueous potassium carbonate, and after the addition is complete the organic layer is separated from the aqueous catalyst solution, the excess isobutyraldehyde is stripped off and the product is then distilled at reduced pressure. This method avoids yield loss due to other condensation reactions since the mixed aldol is heat stable in the absence of the catalyst solution.

Table I contains comparative results obtained using the method described in the prior art and the process of the present invention in preparing hydroxypivalaldehyde from isobutyraldehyde and formaldehyde. In addition to the higher conversions and yields obtained by the process of the present invention, it is immediately obvious that there is no loss of reagents to the formation of higher condensation products and the aldehyde being added to the isobutyraldehyde is substantially completely reacted. This is particularly advantageous where hydroxypivalaldehyde is being made, since it avoids any of the difficulties involved in destroying or removing residual traces of formaldehyde.

TABLE I

| Run No. | Mole Ratio, i-HBu/CH₂O | Solvent | Catalyst, Weight Percent | Reaction Temp., °C. | Reaction Time | i-HBu, Percent Conv. | HOPA, Percent Yield |
|---|---|---|---|---|---|---|---|
| 1 | 1:1 | CH₃OH | 0.5 KOH | 20-25 | 2 hours | 47 | 28 |
| 2 | 1:1 | CH₃OH | 0.5 KOH | 20-25 | 24 hours | 83 | 80 |
| 27 | 2:1 | H₂O | 4.0 K₂CO₃ | 60-70 | 2 hours | 91 | 90 |
| 28 | 2:1 | H₂O | Recycle 3 | 60-70 | do | 86 | 97 |
| 29 | 2:1 | H₂O | Recycle 1 | 60-70 | do | 82 | 91 |
| 30 | 2:1 | H₂O | 4.0 K₂CO₃ | 60-70 | do | 93 | 94 |
| 32 | 2:1 | H₂O | 2.0 NaO₂CCH₃ | 60-62 | do | No reaction | |
| 34 | 2:1 | H₂O | 2.0 KOH | 10 | 30 minutes | 112 | 73 |
| 37 | 2:1 | H₂O | 2.0 NaOH | 10 | do | 109 | 79 |
| 22 | 2:1 | H₂O | 4.0 K₂CO₃ | 60-100 | 2 hours | 96 | 70 |
| 23 | 1.1:1 | H₂O | 4.0 K₂CO₃ | 60-89 | do | 84 | 74 |

In Table I, the isobutyraldehyde percent conversion represents the amount of isobutyraldehyde reacted under the conditions employed. Runs Nos. 1, 2, 34, and 37 show the results using alcoholic and aqueous alkali at lower temperatures. Here the isobutyraldehyde reacted was considerably more than the hydroxypivalaldehyde yield due to the formation of other products. In run 22 the reaction temperature was allowed to go to 100° and in this run a considerable amount of the hydroxypivalaldehyde was converted to the glycol ester by the Tischenko reaction. In run 23 only a tenth mole excess of isobutyraldehyde was employed and again a yield loss was experienced due to a cross Cannizzaro reaction between hydroxypivalaldehyde and formaldehyde to form the pentaglycol.

Table II summarizes the results obtained in the preparation of the mixed aldols of isobutyraldehyde with acetaldehyde, propionaldehyde and normal butyraldehyde. Although comparative data on operations outside of the invention is not given, the advantages of this method of preparing mixed aldols of isobutyraldehyde over that wherein an alkali metal hydroxide is used at low temperature should be immediately obvious to those skilled in the art. Thus, the only product obtained is the mixed aldol of isobutyraldehyde and the added aldehyde, and no isobutyraldol or aldol of the added aldehyde is formed.

TABLE II

| Added Aldehyde | No. of Moles Excess i-HBu | K₂CO₃, Weight Percent | Reaction Temp. °C. | Reaction Time, hours | i-HBu, Conv. Percent | Mixed Aldol, Yield Percent |
|---|---|---|---|---|---|---|
| CH₂O | 1 | 4.0 | 60-75 | 2 | 91 | 90 |
| CH₂O | 2 | 2.0 | 60-70 | 2 | 88 | 96 |
| CH₂O | 5 | 2.0 | 60-62 | 2 | 97 | 97 |
| HAc | 1 | 4.0 | 60-70 | 4 | 93 | 91 |
| HPr | 1 | 4.0 | 60-70 | 4 | 92 | 96 |
| n-HBu | 1 | 4.0 | 60-70 | 3 | 90 | 92 |
| n-HBu | 2 | 3.0 | 60-70 | 4 | 96 | 97 |

The invention is further illustrated by the following specific examples.

*Example 1*

Eleven hundred fifty grams of isobutyraldehyde and 56 grams of potassium carbonate dissolved in 90 grams of water were added to a stirred three-necked flask and heated to reflux. Six hundred fifty grams of a 37% formalin solution was added over a period of 30 minutes and the reaction temperature was held below 70° C. by cooling as necessary. The reaction mixture was stirred at 65-70° C. for two hours and at the end of this time the mixture was allowed to cool to 40° C. and the organic layer decanted. Unchanged isobutyraldehyde was distilled off and the residue was distilled at reduced pressure. Seven hundred ninety grams of hydroxypivalaldehyde, boiling point 78-85° C. at 4 mm. was obtained. The hydroxypivalaldehyde dimerized on standing and formed a white crystalline dimer, melting point 92-94° C.

This reaction runs very well on a continuous basis by passing the reaction products through a condenser and then to a decanting step. The isobutyraldehyde which is distilled off thereafter is returned to the reaction continuously, the reaction being operated at 62-64° C.

*Example 2*

Eight hundred seventy-six grams of normal butyraldehyde was added to 1,150 grams of isobutyraldehyde at reflux in the presence of 46 grams of potassium carbonate dissolved in 90 grams of water over a one-hour period. The reaction temperature was maintained at 60-70° C. and at the end of the addition the mixture was heated an additional two hours at 70° C. The reaction mixture was cooled to 40° C. and the organic layer decanted. Excess isobutyraldehyde was distilled off at atmospheric pressure and the residue was distilled through a 10-plate column at reduced pressure to yield 1,061 grams of 3-hydroxy-2,2-dimethylhexaldehyde, boiling point 125° C. at 14 mm.

*Example 3*

Using the procedure of Example 2, 8 moles of acetaldehyde were reacted with isobutyraldehyde using a molar excess of isobutyraldehyde and a 91% yield of 3-hydroxy-2,2-dimethylbutyraldehyde, boiling point 90° C. at 22 mm. was obtained.

*Example 4*

Using the same procedure as in Example 2, 8 moles of propionaldehyde were reacted with a molar excess of isobutyraldehyde and a 96% yield of 3-hydroxy-2,2-dimethylvaleraldehyde, boiling point 98° C. at 20 mm. was obtained.

Sodium carbonate can also be used in the above examples.

I claim:

1. A process for the preparation of hydroxypivalaldehyde wherein said aldehyde is produced in extremely high yield and is substantially the sole aldol product, which comprises adding formalin to excess isobutyraldehyde maintained at 50-90° C. in contact with aqueous potassium carbonate.

2. A process for the preparation of an aldol product of the formula $$RCH(OH)C(CH_3)_2CHO$$

wherein the said aldol is produced in extremely high yields and is substantially the sole aldol reaction product in each case, comprising adding an aliphatic aldehyde of the formula RCHO to a solution of isobutyraldehyde maintained at 50-90° C. and containing 2-10% aqueous alkali metal carbonate based on the quantity of isobutyraldehyde used, the isobutyraldehyde being present in substantial molar excess over the quantity of aliphatic aldehyde added, the symbol R being selected from the group consisting of H and $C_1$-$C_9$ alkyl radicals, and said isobutyraldehyde solution being maintained at 50 to 90° C. during the reaction.

3. A process according to claim 2 wherein the isobutyraldehyde is present in a 1-5 mole excess, the alkali metal carbonate being aqueous potassium carbonate.

4. A process according to claim 2 wherein the added aldehyde is formaldehyde.

5. A process according to claim 2 wherein the added aldehyde is acetaldehyde.

6. A process according to claim 2 wherein the added aldehyde is propionaldehyde.

7. A process according to claim 2 wherein the added aldehyde is n-butyraldehyde.

References Cited in the file of this patent

UNITED STATES PATENTS

| | | |
|---|---|---|
| 2,468,710 | Hull | Apr. 26, 1949 |
| 2,684,385 | Biribouer et al. | July 20, 1954 |

OTHER REFERENCES

Plattensteiner: Monat. fur Chemie, vol. 22, pages 14 and 15.
Kohn: Monat. fur Chemie, vol. 22, pages 23 and 24.
Lieben: Monat. fur Chemie, vol. 22, pages 291–98.
Wessely: Monat. fur Chemie, vol. 21, pp. 216–220 (1900).
Stiller et al.: J. Am. Chem. Soc. 62, p. 1787 (1940).